Patented Jan. 1, 1929.

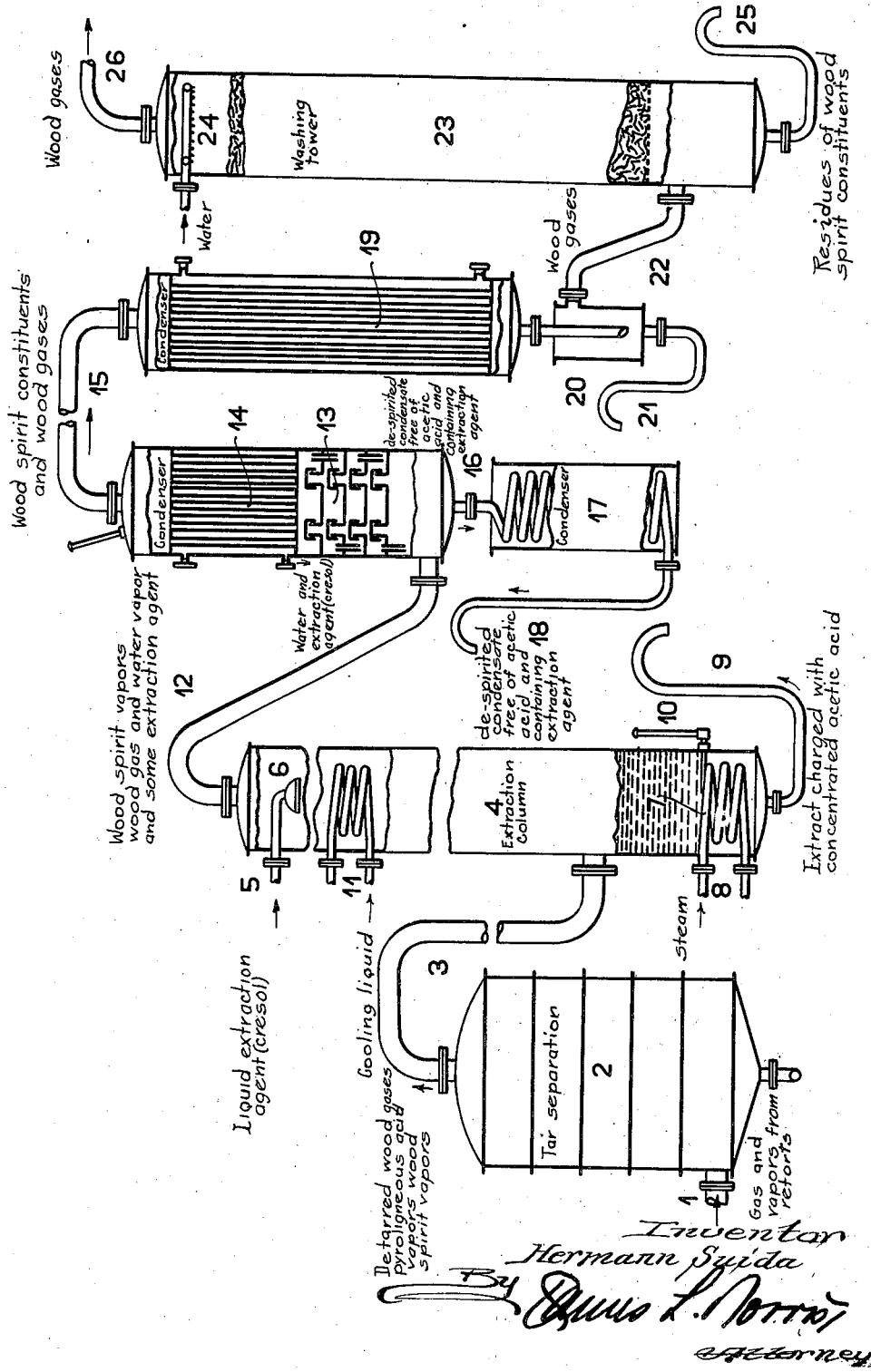

1,697,738

UNITED STATES PATENT OFFICE.

HERMANN SUIDA, OF MODLING, NEAR VIENNA, AUSTRIA.

PROCESS FOR THE RECOVERY OF CONCENTRATED ACETIC ACID.

Application filed March 16, 1927, Serial No. 175,832, and in Austria July 31, 1926.

Dilute acetic acid of any origin, for example crude pyroligneous acid, is employed as the raw material in the processes heretofore set forth by the inventor for the production of concentrated acetic acid, using an extraction agent which boils at a higher temperature than acetic acid. The crude pyroligneous acid can be used for these processes only after the tarry components have been removed therefrom, since otherwise the tarry components would pass into the extraction agent. In carrying out the said processes the crude pyroligneous acid is freed from a part of the tar by being allowed to stand while the remainder (the so-called soluble tar) remains behind as a residue when the crude pyroligneous acid is evaporated. Furthermore, the manner in which these processes are performed requires the employment of a raw material from which the wood spirit has been removed, that is to say, the wood spirit must first of all be expelled from the pyroligneous acid. The evaporation of the dilute pyroligneous acid and the removal of the spirit therefrom require a considerable expenditure of heat which amounts to almost two thirds to three quarters of the total heat expended in the concentration process according to the above method.

Recently so-called tar-separating processes have been adopted in the wood-carbonization industry. In the said processes the vapours leaving the retorts of the wood-carbonizing ovens during the process of carbonizing are not first of all condensed and then freed from the tarry constituents, but the mixture of hot gases and non-condensable vapours is freed from the tarry constituents by washing with tar-oils. Consequently tar-free vapours and gases emerge from the tar-separators of known design, whatever their construction, which are connected to the ovens or retorts. Operation according to the processes mentioned at the beginning hereof would, however, even in this case, make it necessary that the vapours (tar-free pyroligneous acid and wood spirit) be condensed and that the wood spirit be removed from the condensate with the above-mentioned heat-expenditure, and that the condensate then be completely evaporated before it is subjected to the concentration process.

It has now been found that such condensation and evaporation may be avoided and a material economy in heat may be achieved, if the mixture of wood-gases and of pyroligneous acid and wood-spirit vapours is immediately subjected after the tarry constituents have been removed therefrom in a tar-separator, to extraction by means of an extraction agent of higher boiling point than acetic acid, the condensation of the wood-spirit constituents being effected only after the acetic acid has been extracted, and the wood gases also being separated from the wood-spirit constituents only after the extraction of the acetic acid.

The process consists in causing the mixture of wood-gases and of acetic acid, water and wood-spirit vapours coming from the tar separator to flow through an extraction column in which it is treated by, for example, spraying with a suitable extraction agent, for example with cresol. For the purpose of better regulating the temperature of the extraction column it is preferable—but not absolutely essential—to provide a small cooling coil in the upper part of the extraction column. The acetic acid is completely removed in the extraction column by the extraction agent which is still liquid at the extraction temperature. The extract, consisting of the extraction agent and concentrated acetic acid, is brought to a suitable degree of concentration by super-heating in the lower part of the extraction column and the extraction agent, charged with a concentrated 80–90% acetic acid, leaves the apparatus at the lower end, whereupon it is treated as in the previous processes to yield concentrated acetic acid and pure extraction agent. The water-vapour, practically free from acetic acid, the wood-spirit vapours (which, at the temperature of about 100° prevailing in the column, pass the acetic acid extraction agent unaltered), all of the wood gases and the vapours of any entrained acetic acid extraction agent escape from the upper end of the column. The water vapour and only the entrained vaporous acetic acid extraction agent are condensed in an adjoining column having a superimposed condenser by suitably adjusting the temperature, whereas the wood-spirit constituents and the wood gases leave this auxiliary apparatus at the upper end. The wood spirit constituents (methyl alcohol and acetone) are deposited in a following condenser, which is supplied with cold water, whereas the wood-spirit and wood-spirit concomitants (allyl alcohol, aldehydes, hydrocarbons, etc.) are removed from the wood gases in an adjoining washing tower in known manner either by water or steam or even by a suitable extraction agent. The mixture of water, free from acetic acid, and suspended and dissolved acetic acid extraction agent deposited in the first auxiliary column is freed from the suspended acetic acid extraction agent by being allowed to stand (decantation), the said agent being returned to the process. The acetic acid extraction agent dissolved in the water is recovered in a suitable manner and is also returned to the process.

The material technical progress achieved by the new method of operation resides in the reduction, by utilizing the oven-heat (retort heat), of the heat expenditure for the concentration process to about one third to a quarter of the amount used hitherto.

The process will now be described with reference to the accompanying drawing: The gases and vapours escaping from the retorts or ovens during the carbonization enter the tar separator 2 of any desired construction at 1 and are completely de-tarred therein by spraying with tar oils or tar. If it is necessary for the complete de-tarring, a second tar separator may be brought into operation. The completely de-tarred wood gases, pyroligneous acid vapours and wood-spirit vapours leave the tar separator through the pipe 3 and enter the extraction column 4. The latter is either filled with "Raschig" rings or is constructed as a column with intermediate bottoms. The gases and vapours flow upwardly and encounter the liquid extraction agent, for example, cresol, which enters at 6 through the pipe 5 and is sprayed downwardly. The agent extracts the acetic acid completely and passes, charged with concentrated acetic acid, into the lower part of the extraction column, which lower part is heated by a steam coil 8. The extract charged with concentrated acetic acid collects at 7 and finally flows away continuously through the swan's-neck tube 9. The extract is then conducted, for the purpose of being separated into concentrated acetic acid and extraction agent free from acetic acid, into a vacuum apparatus. If the thermometer 10 indicates a temperature of, for example, 140-145°, then an extract which contains acetic acid of about 90% flows out at 9. The temperatures in the column 4 are somewhere above 100°. The temperature in the column may be controlled by the small cooling coil 11 for the purpose of neutralizing excess extraction (condensation) heat in certain circumstances, for instance, in the case of irregular supply-flow of the gases and vapours from the ovens; this measure is, however, in no way a material feature of the process. The wood-spirit vapours, wood-gases and the water vapour, free from acetic acid but carrying with them some entrained extraction agent, emerge through the pipe 12. This mixture passes into the lower portion of the column 13 which is provided with a superposed condenser 14. The superposed condenser 14 is so adjusted by suitable control of the supply of water thereto that only the water and cresol or the greater part of the water and the total entrained cresol are condensed and flow down through the column 13, while the wood-spirit constituents pass completely through the condenser and leave the apparatus with the wood-gases through the pipe 15. Thus there collects at the lower end of the column 13 a completely de-spirited, acetic acid free condensate which contains the whole of the entrained extraction agent; it flows at 16 into the condenser 17 and can flow off through the swan's-neck pipe 18. The condensate is then separated, by decanting and washing with cold water, into acetic acid extraction agent and water free from both acetic acid and wood-spirit so that any small quantities of extraction agent (cresol) still dissolved in the water may be recovered. The wood gases and wood-spirit vapours emerging through the pipe 15, being still at a temperature of about 70-80°, flow into the upper end of the tube-condenser 19, in which the wood spirit is in great part deposited, and leave the apparatus through the separating vessel 20 and the swan's-neck pipe 21. The wood gases pass through the pipe 22 into the lower end of the washing tower 23 and are subjected, by the spraying device 24 at the upper end of said tower, to a rain of cold or warm water or of a suitable solvent by which, in known manner, the last residues of the wood-spirit constituents are removed from the wood gases. The said residues collect at the base of the tower 23 and are removed through the swan's-neck pipe 25. The wood gases which are now free from condensable constituents escape through the pipe 26.

In the whole process heat is only required in a small quantity at a single place, that is in the steam coil 8 at the lower end of the column 4, for the purpose of superheating the vapours in the column 4. It is possible in this manner to obtain in a continuous operation concentrated acetic acid, crude wood spirit of high concentration and wood gases free from wood spirit.

What I claim is:—

1. A process for the recovery of concentrated acetic acid in the carbonization of wood, comprising detarring the mixture of wood gases, pyroligneous acid vapours and wood-spirit vapours, subjecting the detarred mixture in vapourous or gaseous condition directly to extraction with an extraction agent difficultly soluble in water and having a boiling point higher than that of acetic acid to remove the acetic acid from the mixture and withdrawing the acetic acid in a concentrated state as a liquid with the extraction agent.

2. A process for the recovery of concentrated acetic acid and wood spirit in the carbonization of wood, comprising removing the tarry constituents from the mixture of wood gases, pyroligneous acid vapors and wood spirit vapors, subjecting the detarred mixture in vaporous or gaseous condition directly to extraction with an extraction agent difficultly soluble in water and having a boiling point higher than that of acetic acid to remove the acetic acid from the mixture, withdrawing the concentrated acetic acid and extraction agent in the form of a liquid, and separating the wood spirit from the remaining mixture of vapor and gas.

In testimony whereof I have hereunto set my hand.

HERMANN SUIDA.